(12) United States Patent
Borza et al.

(10) Patent No.: US 12,307,470 B2
(45) Date of Patent: May 20, 2025

(54) SYSTEMS AND METHODS FOR TRACKING RECEIPT OF A GIFT

(71) Applicants: Allen Borza, Lake Worth, FL (US); Eric Paul Ciccotelli, Culuota, FL (US)

(72) Inventors: Allen Borza, Lake Worth, FL (US); Eric Paul Ciccotelli, Culuota, FL (US)

( * ) Notice: Subject to any disclaimer, the term of this patent is extended or adjusted under 35 U.S.C. 154(b) by 157 days.

(21) Appl. No.: 17/938,071

(22) Filed: Oct. 5, 2022

(65) Prior Publication Data

US 2023/0106411 A1    Apr. 6, 2023

Related U.S. Application Data

(60) Provisional application No. 63/252,368, filed on Oct. 5, 2021.

(51) Int. Cl.
*G06Q 10/00* (2023.01)
*G06Q 30/0201* (2023.01)
*G06Q 30/0204* (2023.01)

(52) U.S. Cl.
CPC ..... *G06Q 30/0201* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 2002/0032752 A1* | 3/2002 | Gold | G06Q 30/02 709/218 |
| 2009/0024530 A1* | 1/2009 | Porter | G06Q 30/00 705/26.1 |
| 2012/0209748 A1* | 8/2012 | Small | G06Q 30/06 705/27.1 |
| 2013/0204739 A1* | 8/2013 | Friedman | G06Q 30/02 705/26.7 |
| 2014/0316937 A1* | 10/2014 | Jiao | G06Q 30/0643 705/26.8 |
| 2016/0026249 A1* | 1/2016 | Glass | G06Q 30/0621 715/702 |
| 2020/0349611 A1* | 11/2020 | Publicover | H04N 21/252 |
| 2022/0156790 A1* | 5/2022 | Bigley | G06K 7/1417 |

OTHER PUBLICATIONS

Miller, Abby, Online Service Lets People Send, Receive Gifts Anonymously, Nov. 17, 1999, Digital Marketing News, https://www.dmnews.com/online-service-lets-people-send-receive-gifts-anonymously/, p. 1-4. (Year: 1999).*

* cited by examiner

*Primary Examiner* — Joseph M Waesco
(74) *Attorney, Agent, or Firm* — Allen F. Bennett; Bennett Intellectual Property

(57) ABSTRACT

A method for tracking receipt of a gift includes creating an online message, generating a link associated with a landing page, a reveal code to unlock the online message at the landing page. An anonymous sender creates an off-line gift and sends the gift, a link to the landing page, and the reveal code to one or more recipients, either together or in various combinations. When a recipient follows the link and enters the reveal code, the online message is displayed. The message may include the identify of the sender. The online message detects when the one or more recipients land on the page and collects data on the one or more recipients.

8 Claims, 5 Drawing Sheets

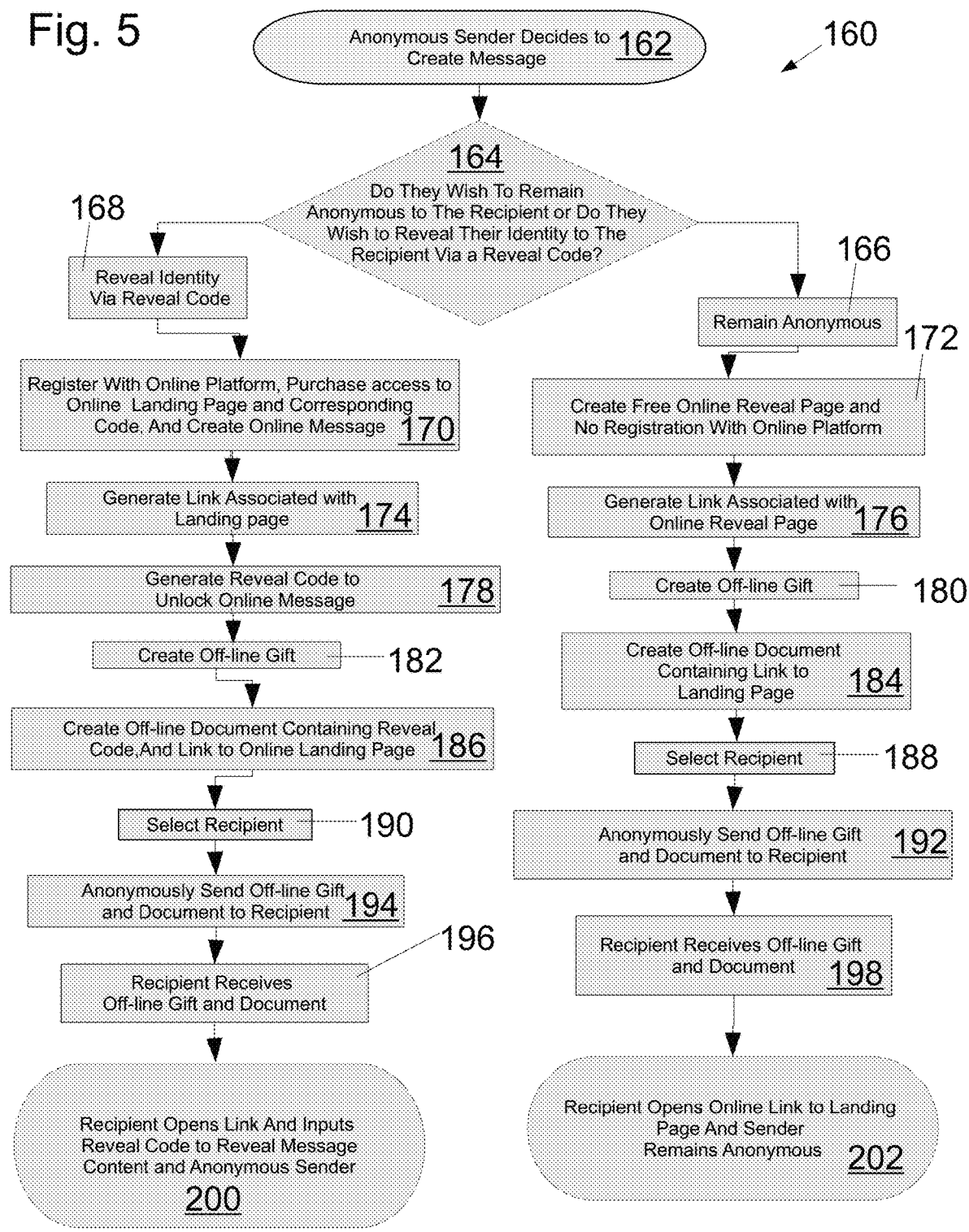

SYSTEMS AND METHODS FOR TRACKING RECEIPT OF A GIFT

CROSS-REFERENCE TO RELATED APPLICATIONS

This application claims priority to U.S. Provisional Application Ser. No. 63/252,368 filed on Oct., 5, 2021 the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable.

BACKGROUND OF THE INVENTION

Field of the Invention

The present invention relates to a method for tracking receipt of a gift. More particularly, the invention relates to an improved method of gift-giving that facilitates acquisition of online data and analysis.

Description of the Related Art

Corporate gifting has become a major industry. It is commonplace for companies to send out cards and/or gifts to customers, vendors, and associates within the industry, and is often used as a marketing technique. Companies will send gifts not only as tokens of appreciation and gratitude to customers but will also send free gifts to prospective customers in the hope of attracting more business.

Unfortunately, it is difficult for companies to evaluate the effectiveness of such gift-giving. Often these gifts are sent to a recipient's business address. However, the gift might never be seen by the intended recipient due to oversight by a receptionist, assistant, or secretary, to whom the gift is often delivered by the postal worker. Moreover, once in the hands of the desired recipient, it may be reviewed upon opening and quickly forgotten about. This is especially true around holidays when companies and employees receive many gifts from many sources. Furthermore, a gift's sender has no way of knowing whether the recipient became aware of who the sender was, nor can they guarantee that the recipient will ever visit the sender's website. Thus, there is no direct way to evaluating the effectiveness of attracting a recipient's attention, and ultimately their business, by sending them a physical gift. In addition, receiving a gift and/or card does not directly generate any interaction between the sender and recipient, or with the sender's website, social media page, phone number or other means of contact. There is thus little chance that the sender will ever be able to glean any real data for evaluating the efficacy of gift-giving as a marketing tool.

One solution is to send a gift in an email that allows the receiver to redeem a gift card. This would allow the sender to track when the recipients clicks on the link or otherwise obtains their gift. Additionally, the sender would be able to evaluate which gifts are responded to the fastest, most likely to be used and obtain various tracking information, such as the email and IP address, of the recipients. Unfortunately, gifts sent via email have their own problems. Such messages are often discarded as spam and are easily overlooked. Such gifts are also usually in the form of a gift card or other relatively impersonal items and are therefore less likely to make an impact. In addition, a gift provided electronically is easier to dismiss and less memorable than a physical card or package received via snail mail. Nonelectronic, off-line gifts tend to provide the most distinct impression and receive more attention than email gifts.

The above-described deficiencies of today's systems are merely intended to provide an overview of some of the problems of conventional systems and are not intended to be exhaustive. Other problems with the state of the art and corresponding benefits of some of the various non-limiting embodiments may become further apparent upon review of the following detailed description.

It is therefore an object of the present invention to provide a means for generating marketing data including online tracking data directly associated with an off-line gift. From a corporate perspective, the principles of the invention provide the ability to improve the gift-giving experience with a multimedia online message that provides response data (replies, opens, actions and behavior). From a personal perspective, the principles of the invention provide the ability to improve the gift-giving experience PLUS customized surprise pages.

In view of the foregoing, it is desirable to provide a physical gift that allows a sender to obtain tracking data for marketing analysis.

BRIEF SUMMARY OF THE INVENTION

Disclosed is a method for tracking receipt of a gift that includes the steps of identifying one or more recipients, assigning at least one message to each of the recipients, sending an off-line gift to each of the one or more recipients, sending a link to a landing page to each of the one or more recipients, sending a reveal code to each of the one or more recipients and, upon one of the one or more recipients entering the reveal code on the landing page, displaying the at least one message assigned to that recipient.

Data relating to a recipient's interactions with the message may also be collected. In some embodiments, the message identifies the sender. The message may include at least one interaction module which allows the recipient to perform a task, such as sending the sender a reciprocal gift, sending the sender a thank you note, making a donation to a third party, and selecting the off-line gift.

In some embodiments, both the reveal code and the link to the landing page are attached to the off-line gift. The reveal code and link to the landing page may also be sent as a gift receipt from a third party from which the off-line gift was sent.

In some embodiments, the reveal code and link may be provided via an email, an SMS text message, or a notification from a cellphone software application. They may take the form of an alphanumeric code, a scannable code, a QR code, a bar code, an answer to a challenge question, a biometric reading of the recipient, a geographic location of the recipient.

In some embodiments, the data collected may include an IP address from which the link is accessed, a number of times the link has been accessed. The data may also optionally be associated with the recipients. The messages may be assigned to recipients by creating one or more recipient groups, and assigning one of the at least one messages to each of the recipient groups. The recipient groups may be assigned according to the geographic locations of the recipients, or may be assigned randomly.

In some embodiments, the data collected may include the amount of time each of the recipients interact with each of the interaction modules, the date and time on which the one or more recipients interact with each of the interaction modules, and the number of times the one or more recipients interact with each of the interaction modules.

In other embodiments, the method for tracking receipt of a gift may include identifying one or more recipients, sending an off-line gift to each of the one or more recipients, sending a link to a landing page to each of the one or more recipients, sending a reveal code to each of the one or more recipients, and generating and displaying a message for the recipient when the recipient enters the reveal code on the landing page. The message may be generated based on one or more of that recipient's geographic location, type of electronic device used to access the landing page, a number of times that the reveal code has been entered, a date on which the reveal code is entered, a number of times that the reveal code has been entered by that recipient; a type of browser used by that recipient to access the landing page.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 is a flowchart of an alternative embodiment of a method for tracking receipt of a gift in accordance with the principles of the invention.

DETAILED DESCRIPTION

Figure 1:
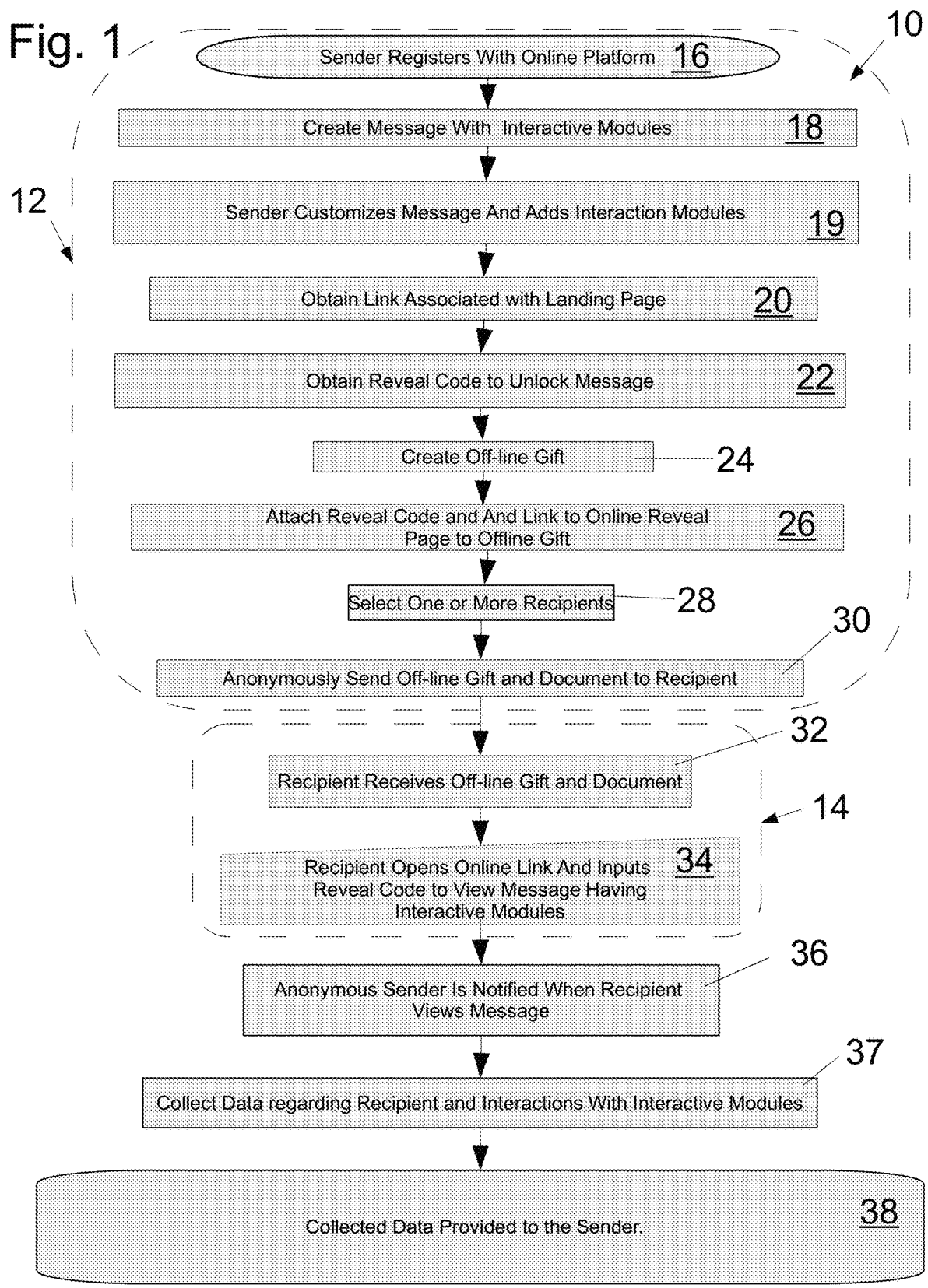
FIG. 1 is a flowchart of a method for tracking receipt of a gift in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Unless otherwise indicated, all numbers expressing quantities, dimensions, reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting.

Various embodiments of the disclosure could also include permutations of the various elements recited in the claims as if each dependent claim was a multiple dependent claim incorporating the limitations of each of the preceding dependent claims as well as the independent claims. That is, the combinations of the various components of the invention are not limited to those combinations expressly described. Unless expressly stated otherwise, components described in one embodiment may be interchanged with components of the same name found in other embodiments. Components found in one embodiment may similarly be added to and/or combined with other embodiments. Such permutations are expressly within the scope of this disclosure.

Disclosed is a method for tracking receipt of a gift comprising creating an online message accessed through a landing page. The message may include one or more interaction modules. A sender may obtain a link to a landing page, managed by the sender itself or optionally by a third party operating a platform for facilitating the systems and methods of the invention. A sender may also obtain a reveal code that may be inserted onto the landing page in order to generate a message. The sender may generate a new reveal code, use an existing one, or purchase a reveal code from a third-party managing a platform which facilitates the principles of the invention. The sender can then send an off-line gift, the reveal code and the link to the landing page to one or more recipients. One or all of these items may be sent anonymously, and they may be sent together or separately, or in different combinations.

When the recipient follows the link to the landing page and enters the reveal code, the message selected by the sender is displayed. The online landing page and/or message detects when the recipient lands on the page and collects data on the recipient. Those skilled in the art will appreciate that landing pages themselves as well as objects displayed on an Internet page through a browser are capable of tracking many types of data, including the location of the electronic device being used to access it, the amount of time spent at a particular landing page or viewing a message, the amount of time a recipient spends engaged with an interaction module within the message, the type of browser used to access the landing page and message, the upload and download speed of the electronic device engaging the landing page or message, and the like. Those skilled in the art will appreciate that there is a wide variety of data that may be collected when a person such as a recipients interacts with a landing page, message and interaction modules of the invention. The fact that the recipient can access the message using the reveal code establishes that the reveal code was received by the person operating the electronic device. By using various interacting modules, the sender can gauge how interested the recipient is in the message and/or the functions of the various interaction modules. Data regarding a recipient's interaction with the landing page, message and/or interaction modules can be collected, organized and provided to the sender.

FIG. 1 displays a flowchart of a method for tracking receipt of a gift 10, in accordance with the principles of the invention. In this embodiment, an online platform facilitates the systems and methods of the invention. The receipt of a gift 10 is tracked by a series of steps performed by the sender 12, followed by a series of steps completed by the recipient 14. First, a sender registers with the online platform 16. This is done by creating an account and purchasing a single message or multiple messages through the platform. Optionally, a single reveal code or multiple reveal codes can be purchased at a retail store and activated at the cash register, as per retail gift cards, or activated by the sender logging into or creating its account on a third-party platform. Once an account has been made and a message or multiple messages have been created or purchased, the sender has access to a dashboard to track, create, and edit each message associated with its account. The sender can then identify one or more recipients and assign one or more messages and reveal codes to each of the recipients. Optionally, the sender may organize the one or more recipients by dividing them into specific groups of recipients, based on the recipients' geographic location, gender, age, or other parameters. Each of the groups of recipients may be assigned one or more messages.

The sender then uses the dashboard to generate and customize an online message with integrated interactive modules 18. In this embodiment, the online message is used to reveal the sender's identity and includes one or more optional interactive modules to allow the sender to collect data on the recipient. The online message may be customized for a particular gift, particular recipient, or particular category of gift or recipient. Furthermore, the sender may upload a variety of objects to the online message from their computer or mobile device 19, including audio files, gifs, videos, interactive displays, or the like. These interactive modules can include components, such as questionnaires, fillable forms, raffles, games, video links, links to the sender's website or other websites. Optionally, the interactive modules inside the online message could be utilized as party invitations, to launch or relaunch a campaign, or to redirect recipients to a live video, such as a proposal, zoom meeting, conference, or the like. Furthermore, the online message may be hosted by the online platform or may optionally be a webpage of a separate website owned or managed by the sender or third party. Finally, the online message may serve as a small marketplace for various products sold by a company, or sponsored ads.

Once the online message has been fully customized, the link to the online message will be generated 20 for the sender to provide to the recipient. The link may be a simple internet link that can be typed into a phone or computer internet browser. The sender must also create a reveal code to unlock online message 22. The reveal code may be automatically generated by the platform or customized by the sender. The reveal code can be a PIN, a six-digit code, an alphanumeric string, a QR code, a barcode, a challenge question for which the recipient must enter a correct answer, or the like. This code help to prevent a sender's gift from being opened or redeemed by an unwanted party, and insurers that the correct recipient is the viewer of the message. Optionally, the reveal code may also be a geographic location from which the landing page must be accessed in order for the message to be opened, a type of biometric measurement a recipients must enter on the landing page.

Next, the sender selects an off-line gift 24, the link to the landing page used to enter the reveal code, and the reveal code itself which unlocks and/or displays the online message 26 associated with that reveal code. The offline gift may be cookies, chocolate, other prepared and packed food, a beverage, gift card, flowers, a sentimental object, personalized present, or the like. The gift can also be something more elaborate, such as billboard, a personally delivered message such as a singing telegram, or any other object, performance, or display. The gift may also optionally be something as simple as a gift card or letter. The landing page can be a page created by the sender on its own website or another, or may optionally be a landing page belonging to a third-party which operates the platform the sender is using to perform the systems and methods of the invention. The link to the landing page may be simply the URL of the landing page, or may be translated into a QR code, a barcode, and input code for a phone app, an NFC signal or any other object that may be used to access a landing page. The link to the landing page and/or the reveal code may be attached directly onto the online gift or may be Incorporated into a document such as a car door postcard sent with the off-line gift.

Once an offline gift has been created 24, the sender selects one or more recipients 28 to which the offline gift(s) is sent. The recipient may be an individual, a company, any other type of entity, or a group of entities. After selecting the recipient(s), the offline gift(s) the link to the landing page and reveal code are sent to the recipient(s) 30 by the sender or by the third-party platform being used by the center. These three items may be sent together, individually or in combinations. For example, the landing page and/or reveal code may be attached to the off-line gift by a label or packaging. Optionally, the reveal code and/or landing page may be sent via email, SMS text message or as a notification from a phone application once a sender has received confirmation that the off-line package was delivered. The link and reveal code may be included in an email gift receipt sent to the recipient. For example, the off-line gift may be sent by Amazon® or a similar online retail platform, which then sends a gift receipt email to the recipient that includes the link and the reveal code. Optionally, the link and/or reveal code may be sent with a message indicating that the reveal code may only be used one time. This may reduce the possibility that a receptionist at an organization, rather than the intended recipient, will access the message using the provided reveal code.

The recipient receives the off-line gift, the link and the reveal code (which may be incorporated into a single document) 32 from the sender. The sender may do this anonymously such that the sender's name does not appear on anything sent to the recipient. When the recipient follows the link and enters the reveal code, the identity of the anonymous sender is revealed and the interactive modules are unlocked, or otherwise become engageable by the recipient, 34. The sender can also customize the online landing page to include a countdown once the recipient has entered the reveal code to add further suspense and excitement. This countdown can be customized with confetti, glitter, or further animation. Additionally, the message can be customized to include one or more interaction modules which may initiate media, such as music or video, upon entering the reveal code and may also optionally redirect the recipient to a new webpage. By sending these items anonymously, it piques the recipient's interest, thus making the recipient more likely to engage the link and enter the reveal codes to learn who sent the gift. Typical promotional and marketing postcards and emails in general provide little incentive for a recipient to confirm receipt or to follow up with the sender. By adding mystery into the interaction with the recipient, the sender is much more likely to elicit a response from the recipient. This is especially true when an anonymous sender has sent a gift before the recipient has visited a website or otherwise engaged with the sender. The gift, link and reveal code may optionally be sent non-anonymously, identifying the sender.

When the recipient views the online message 36, data regarding the recipient and its interactions with the landing page and method are collected 37. The sender is provided this information 38 through a dashboard on a third-party platform or otherwise. This allows a sender to determine which interactive modules are most popular with the recipients in order to prepare more effective messages in the future. The data recorded may include the date, time, and IP address each time the online message is accessed. The sender can associate this data with the recipient based on the reveal code used. This allows the sender to acquire and/or confirm a particular physical address for a particular recipient or group of recipients. The sender can also use the IP address or other information to track interactions between the sender's website and the recipient. Additionally, the online message could be programmed to track the duration of time spent on the page by the recipient, the number of visits by the recipient to the online message, the browser used, the type of device, the location of the device, UTM parameters, and the types of interactions with the online message. Finally, the online message can be programmed to notify the sender of delivery confirmation, when and how often the page is opened, and if the recipient failed to land on the online message. This can all be displayed on the sender's dashboard.

Because a recipient does not know who sent the message, the recipient's curiosity greatly increases the likelihood that the link will be followed to identify the sender. This increases the recipient's interaction with the gift, engagement with the web platform, and forms a stronger association and memory with the sender. Furthermore, as opposed to traditional styles of offline gift giving, the probability and duration of interaction between the recipient and the message and/or the messages interaction modules is greatly increased by this process. This provides companies with valuable marketing data and allows them to track the effectiveness of their gift giving. For example, the message could include a Mad Libs® style fill in the blank game that invites the recipient to select words to be inserted into a text to create a humorous story. The words selected by the recipient can provide useful data for marketing analytics. Analytic tools can also be used to measure how long the recipient views and interacts with various regions of the message. Such analysis provides valuable feedback to the sender regarding the effectiveness of targeted marketing and target consumers.

Figure 2:
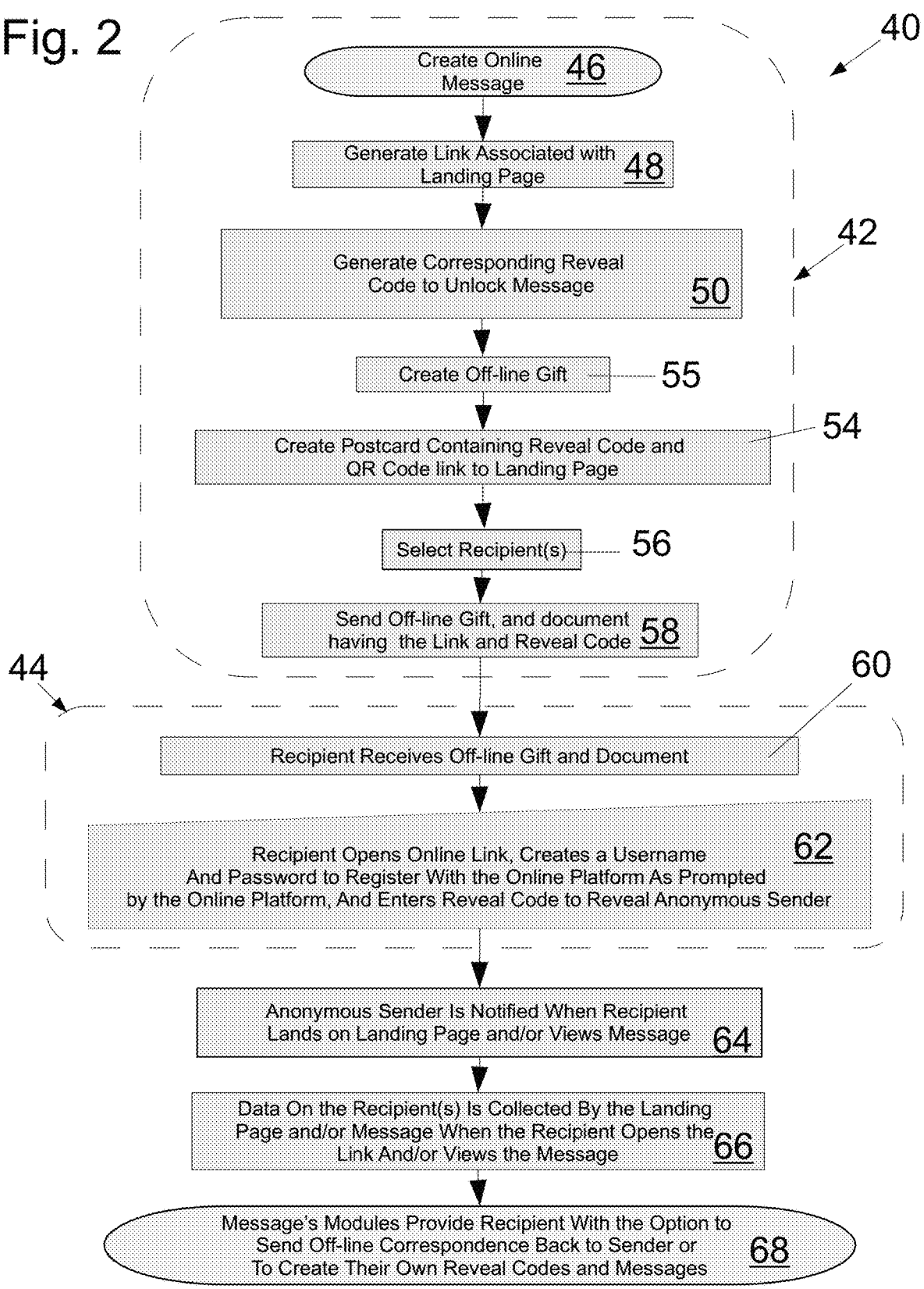
FIG. 2 is a flowchart of an alternative embodiment of a method for tracking receipt of a gift in accordance with the principles of the invention.

FIG. 2 displays a flowchart of an alternative embodiment of a method for tracking receipt of a gift 40, in accordance with the principles of the invention. In this embodiment, an online platform facilitates the systems and methods of the invention. The receipt of a gift 40 is tracked by a series of steps performed by the sender 42, followed by a series of steps completed by the recipient 44. First, a sender uses the platform to generate and customize an online message 46. In this embodiment, the online message is optionally used to reveal the sender's identity. Once the online message has been fully customized, the link to the online message will be generated 48 for the sender to provide to the recipient. In this embodiment, the link is encoded as a QR code or other scannable code. This scannable code may optionally also bypass authentication or confirm authentication. The sender must also create a reveal code to unlock online message 50.

Next, the sender selects an off-line gift 55 and creates a postcard or other document such as a letter, email or text message, containing the QR code for the online message and the reveal code 54. The sender then selects a recipient 56 and anonymously mails the offline gift and sends the document 58. The recipient then receives the off-line gift and document 60 from the anonymous sender by snail mail or delivery. When the recipient scans the QR code on their phone, the online platform directs the recipient to create a username and password to register an account with the online platform. Once they have registered, the recipient can enter the reveal code 62 to reveal the identity of the anonymous sender.

In this embodiment, the sender is notified when the recipient lands on the online message 64 and collects valuable tracking and marketing data on the recipient 66. Furthermore, the message can be customized to allow the recipient to send an online or off-line message, or other response to the sender. This feature can allow the sender to track the recipient's interest level in the product and the company based on their likelihood of the recipient to thank the sender for the off-line gift. In this embodiment, the online message provides the recipient with the option to send receipt of a gift back to the sender or to generate an online message 68. The receipt of a gift can be a thank you card, postcard, gift, or the like. Furthermore, by directing the recipient to create a username and password with the online platform, the recipient is automatically registered with the online platform. This allows the recipient to create their own online message. Thus, providing them with the ability to anonymously send receipt of a gift back to the sender, or to their customers, associates, friends, or family, upon purchasing a customizable message through their account.

Figure 3:
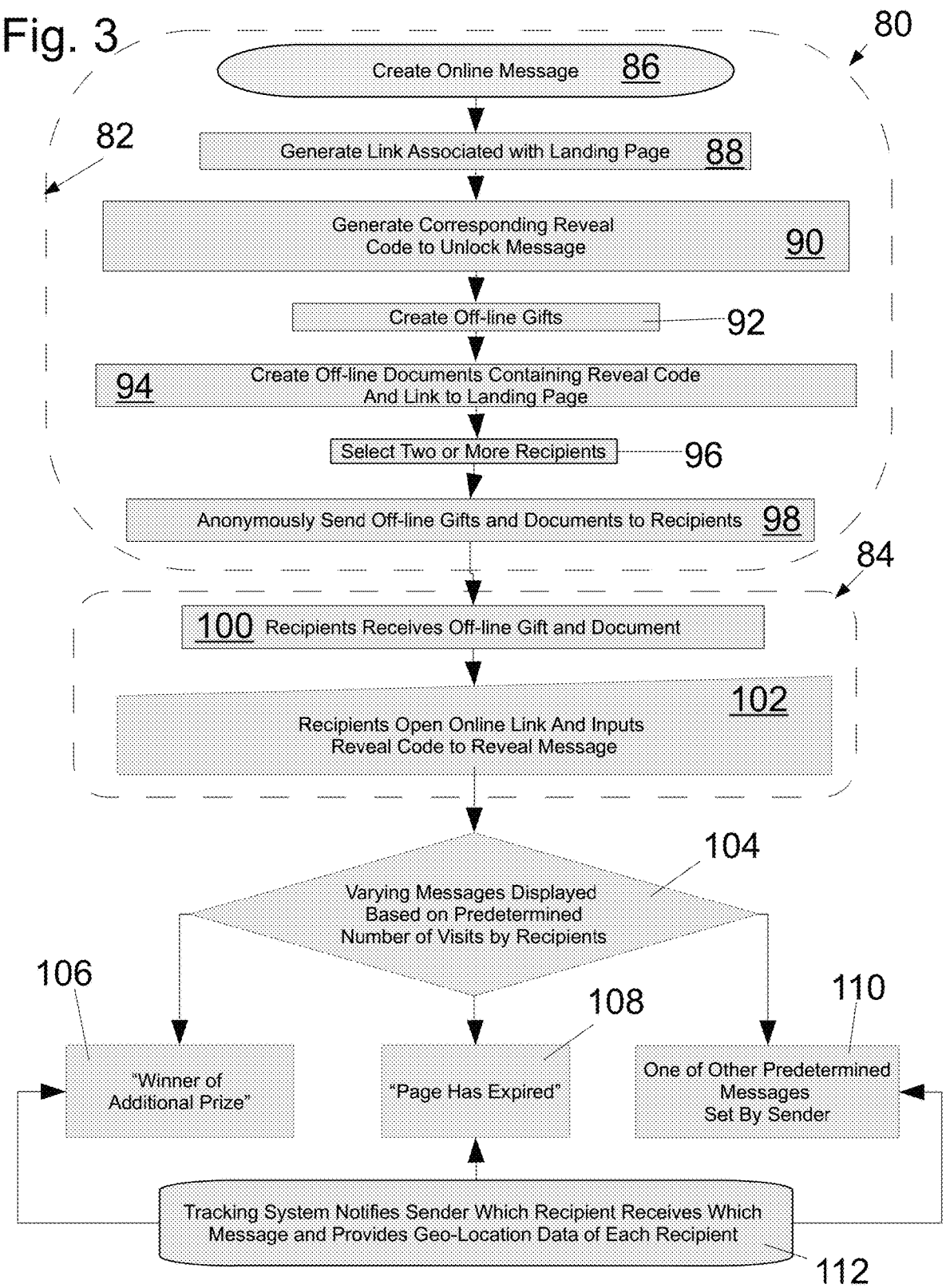
FIG. 3 is a flowchart of an alternative embodiment of a method for tracking receipt of a gift in accordance with the principles of the invention.

FIG. 3 displays a flowchart of an alternative embodiment of a method for tracking receipt of a gift 80, in accordance with the principles of the invention. In this embodiment, an online platform facilitates the systems and methods of the invention. The receipt of a gift is tracked by a series of steps performed by the sender 82, followed by a series of steps completed by the recipient 84. First, a sender uses the platform to generate and customize an online message 86. In this embodiment, a reveal code is used to unlock the online message. Once the online message has been fully customized, the link to the online message will be generated 88 for the sender to provide to the recipient. The sender must also create a reveal code to unlock the online message 90.

Next, the sender creates multiple off-line gifts 92 and documents containing the link for the landing page and the reveal code 94. The sender then selects two or more recipients 96 and anonymously mails the offline gifts and documents 98. The multiple recipients then receive the off-line gifts and documents 100 from the anonymous sender. When the multiple recipients open the link and enters the reveal code 62, the message on the online message is revealed.

In this embodiment, there are varying messages, which have been customized by the sender, set to appear at random or based on a predetermined number of visits by the recipients 104. The sender can use the same message, link, and reveal code for multiple recipients, or may send a unique message to each of many recipients for the same webpage.

In this embodiment, the message displayed can be selected from messages that state "Winner of Additional Prize" 106, "Page Has Expired" 107, or a standard message by the sender 110. These messages can be set to be displayed at a predetermined number of visits or may be programmed to appear at random. Furthermore, the online message contains a tracking system which notifies sender when each message appears and links each recipient with the message they received 112. The tracking system also provides the sender with the geo-location data for each recipient.

Optionally, the sender may create separate online messages for each recipient or for groups of recipients. Additionally, in case of a typographical error or undesired response from the recipients, the sender can change the online message so that after a certain date, anyone using the link and/or reveal code will see the updated version. The online message may also be programmed to change after each time it is viewed. The message can also be preprogrammed to provide different experiences to different recipients based upon the time between the receipt of a gift or message and the time when the message is accessed. Finally, the online message can be programmed to be publicly visible without the need for the reveal code, after a predetermined number of visits or set amount of time.

Figure 4:
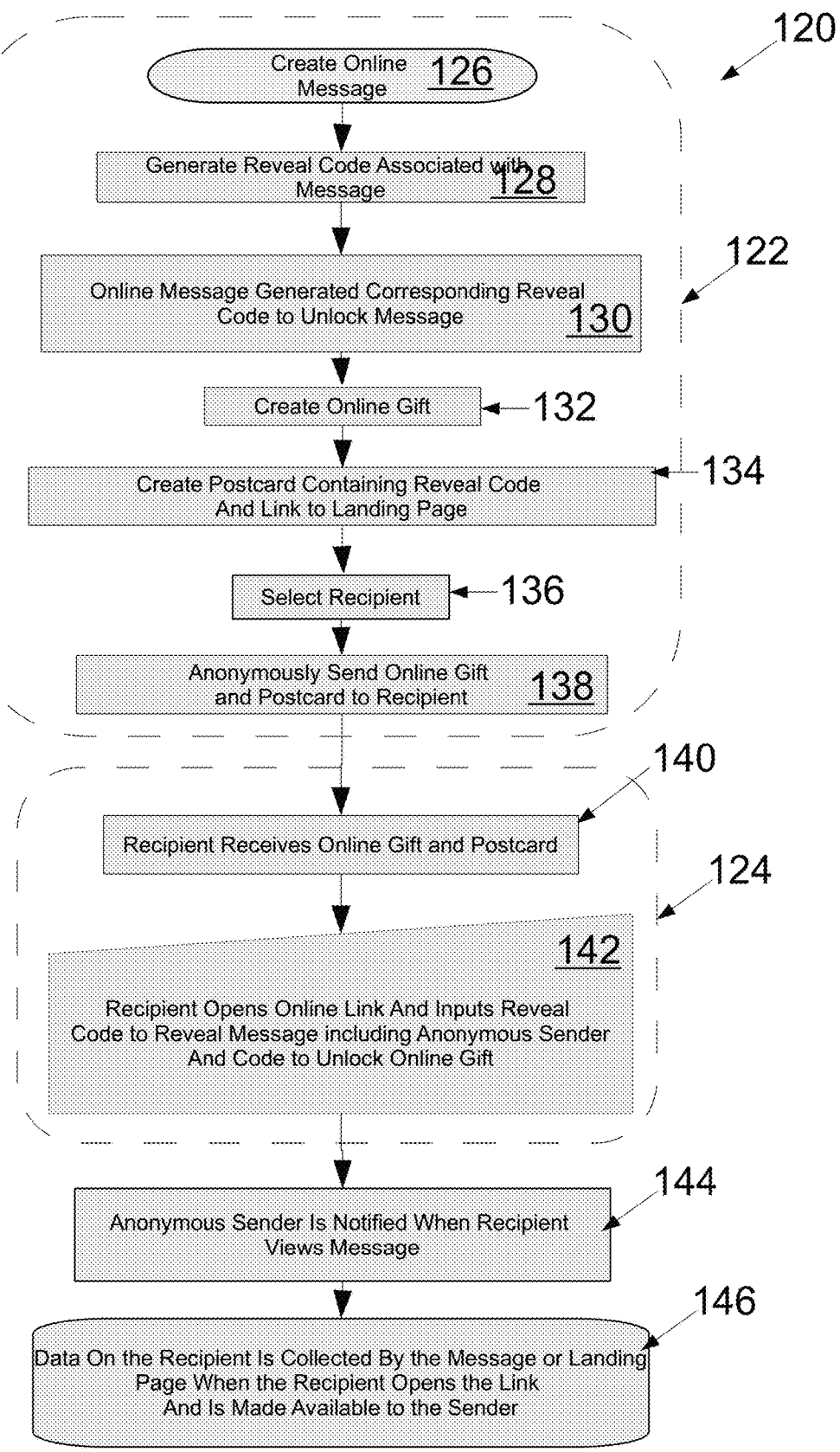
FIG. 4 is a flowchart of an alternative embodiment of a method for tracking receipt of a gift in accordance with the principles of the invention.

FIG. 4 displays a flowchart of an alternative embodiment of a method for tracking receipt of a gift 120, in accordance with the principles of the invention. In this embodiment, an online platform facilitates the systems and methods of the invention. The receipt of a gift 120 is tracked by a series of steps performed by the sender 122, followed by a series of steps completed by the recipient 124. First, a sender uses the platform to generate and customize an online message 126. In this embodiment, the reveal code is used to reveal a message. Once the online message has been customized, the link to the online message will be generated 128 for the sender can provide the link to the recipient. A reveal code is also generated by the online message to be entered when the link is clicked and to unlock online message 134.

Next, the sender selects and sends an online gift and creates a postcard containing the link for the online message and the reveal code 138. In this embodiment, the online gift is sent electronically via email, SMS, through social media, or other means of electronic transfer, and the off-line postcard is sent to the recipients address via snail mail or deliver. The recipient then receives the online gift and document 140. When the recipient opens the online link on their phone or computer and enters the reveal code 142, the identity of the sender is revealed. In this embodiment, the online message is further customized to reveal a code to unlock an online gift. This prevents the online gift from being opened or used by an unwanted party. The online message is also customized to notify the anonymous sender when the recipient lands on the online message 144 and collects valuable tracking and marketing data on the recipient 146. The sender may also receive updates when a gift is sent and when the recipient selects one or more gifts from a list of possible gifts. The message may include one or more interactive modules. One of the interactive modules may optionally allow the recipient to select one or more gifts depending upon a number of redemption points obtained by the recipient.

FIG. 5 displays a flowchart of an alternative embodiment of a method for tracking receipt of a gift 160, in accordance with the principles of the invention. In this embodiment, the sender has the option to choose whether to remain anonymous to the recipient, or to purchase a reveal code to reveal their identity through the online platform 164. First, an anonymous sender decides to use the online platform to generate and customize an online message 162. If the sender wishes to reveal their identity via a reveal code 168, the sender must register with the online platform and purchase an online message and reveal code 170. The sender would then generate a link 174 and a reveal code 178 and create a gift 182 and an off-line document containing the link and reveal code 184, as in other embodiments. The recipient would then be selected 190 and anonymously sent the gift and document 194. Once the recipient receives the off-line gift and document 196, they able to open the online message through the link provided and enter the reveal code to reveal the anonymous sender and the online message content 200. If the sender optionally wished to remain anonymous 166, they create a free online message and are not required to register with the online platform 172. The sender would then generate a link 176, create a gift 180 and an off-line document containing the link 184, select a recipient 188, and anonymously send the gift and document to the recipient 192. The recipient then receives the off-line gift and document 198 and is able to open the online message through the link provided 202. In another embodiment, if the sender initially chose to bypass creating an account and purchasing a reveal code, no message may be displayed by the online message and the sender will remain anonymous.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A method for tracking receipt of a gift comprising:
a sender identifying one or more recipients;
creating one or more recipient groups, wherein each of the one or more recipients are assigned to one or more recipient groups;
assigning a first message to each of the recipient groups;
generating, by a processor, a landing page for each of the one or more recipient groups and a reveal code for each of the one or more recipients;
sending an anonymous off-line gift to each of the one or more recipients, wherein a link to the landing page for the recipient's group and a reveal code for each of the one or more recipients are sent with the anonymous off-line gift; and,
upon one of the one or more recipients entering the reveal code on the landing page using a recipient's electronic device, the processor:
displays the first message assigned to the recipient's recipient group; and,
sends a read receipt for the off-line gift to the sender each time one of the first messages is viewed, the read receipt for the off-line gift including an identity of the recipient who viewed the first message, and the date and time on which the first message was viewed.

2. The method of claim 1 wherein the first message comprises an interaction module and the read receipt for the off-line gift includes the recipient's interactions with the interaction module.

3. The method of claim 1 wherein the reveal code and link to the landing page are sent as a gift receipt from a third party from which the off-line gift was sent.

4. The method of claim 1 wherein the reveal code is selected from the group consisting of an alphanumeric code, a scannable code, a QR code, a bar code, an answer to a challenge question, a biometric reading of the recipient, a geographic location of the recipient.

5. The method of claim 1 wherein the data collected comprises an IP address from which the link is accessed, a number of times the link has been accessed, and further comprises associating the collected data with the one or more recipients.

6. The method for tracking receipt of a gift of claim 1 further comprising:
   wherein upon one of the one or more recipients entering the reveal code on the landing page using a recipient's electronic device, the processor:
      determines an approximate geographic location of the recipient based on the recipient's electronic device's IP address or a location of a base station used by the recipient's electronic device to connect to a wireless network; and,
   wherein the read receipt for the off-line gift further includes the approximate geographic location of the recipient.

7. A method for tracking receipt of a gift comprising:
   a computer generating a landing page, a reveal code, a first message, a second message, and a senders dashboard for an anonymous sender;
   identifying one or more recipients;
   sending an anonymous off-line gift to each of the one or more recipients;
   sending with the anonymous off-line gift a link to the landing page and the reveal code to each of the one or more recipients; and,
   upon one of the one or more recipients entering the reveal code on the landing page, the computer:
      determining an approximate geographic location of each of the one or more recipients based on an IP address the recipient's electronic device, or a location of a base station used by the recipient's electronic device to connect to a wireless network;
      displaying the first message to the recipient if the reveal code is entered prior to a predetermined amount of time after the off-line gift is sent;
      displaying the second message to the recipient if the reveal code is entered after a predetermined amount of time;
      sending the sender a read receipt for the off-line gift, the read receipt including the time and approximate geographic location of the recipient when the reveal code is entered;
   wherein the first message identifies the sender and includes at least one interaction module wherein each module allows the recipient to perform a task;
   wherein the data collected further comprises an amount of time each of the recipients interact with each of the interaction modules, a date and time on which the one or more recipients interact with each of the interaction modules, and a number of times the one or more recipients interact with each of the interaction modules; and,
   wherein the sender dashboard notifies the sender when the data has been collected and displays the data on the senders dashboard.

8. The method for tracking receipt of a gift of claim 6 further comprising:
   assigning a second message to each of the one or more recipient groups;
   wherein the processor:
      displays on the landing page the first message assigned to the recipient's recipient group only if the reveal code is entered prior to a predetermined amount of time after the off-line gift is sent;
      displays on the landing page the second message assigned to the recipient's recipient group if the reveal code is entered after the predetermined amount of time.

* * * * *